(12) United States Patent
Wang et al.

(10) Patent No.: US 8,051,208 B2
(45) Date of Patent: Nov. 1, 2011

(54) METHOD, SYSTEM AND APPARATUS FOR TRANSFERRING SHORT MESSAGES IN AN IMS

(75) Inventors: Xiao Wang, Shenzhen (CN); Peili Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 278 days.

(21) Appl. No.: 12/388,275

(22) Filed: Feb. 18, 2009

(65) Prior Publication Data

US 2009/0213826 A1 Aug. 27, 2009

Related U.S. Application Data

(63) Continuation of application No. PCT/CN2007/070509, filed on Aug. 17, 2007.

(30) Foreign Application Priority Data

Aug. 18, 2006 (CN) .......................... 2006 1 0109853

(51) Int. Cl.
*G06F 15/16* (2006.01)

(52) U.S. Cl. ........ 709/246; 709/236; 709/238; 370/473; 370/474; 370/338; 455/466

(58) Field of Classification Search .................. 709/246, 709/236, 238; 370/473, 474, 338; 455/466
See application file for complete search history.

(56) References Cited

U.S. PATENT DOCUMENTS

| | | | | |
|---|---|---|---|---|
| 7,260,412 B2 * | 8/2007 | Shaheen | ...................... | 455/466 |
| 7,715,856 B2 * | 5/2010 | Shaheen | ...................... | 455/466 |
| 2003/0154300 A1 | 8/2003 | Mostafa | | |
| 2003/0217174 A1 * | 11/2003 | Dorenbosch et al. | ......... | 709/237 |
| 2004/0103157 A1 * | 5/2004 | Requena et al. | .............. | 709/206 |
| 2005/0213537 A1 * | 9/2005 | Ingimundarson et al. | .... | 370/329 |
| 2005/0282565 A1 * | 12/2005 | Shaheen | ...................... | 455/466 |
| 2006/0230154 A1 * | 10/2006 | Nguyenphu et al. | .......... | 709/227 |
| 2006/0258394 A1 * | 11/2006 | Dhillon et al. | ............. | 455/552.1 |
| 2006/0274701 A1 * | 12/2006 | Albertsson | .................... | 370/338 |
| 2007/0032251 A1 * | 2/2007 | Shaheen | ...................... | 455/466 |
| 2007/0110076 A1 * | 5/2007 | Brouwer et al. | ......... | 370/395.52 |
| 2007/0123277 A1 * | 5/2007 | Harris et al. | .................. | 455/466 |
| 2007/0135146 A1 * | 6/2007 | Rezaiifar et al. | .............. | 455/466 |

(Continued)

FOREIGN PATENT DOCUMENTS

CN 1479489 3/2004

(Continued)

OTHER PUBLICATIONS

Zhi Gang Fang, et al., "The research of the service of short messages basing on IMS in next generation network," Shandong Communication Technology, Dec. 2006, No. 12, p. 7-10.

(Continued)

*Primary Examiner* — Dohm Chankong

(74) *Attorney, Agent, or Firm* — Brinks Hofer Gilson & Lione

(57) ABSTRACT

The present invention discloses a method for delivering short messages in an IMS. The method includes: The sender encapsulates multiple concatenated short message segments into an IMS message, and sends the IMS message to the receiver. The present invention also discloses a system and apparatus for delivering short messages in an IMS. Through the embodiments of the present invention, the receiver can obtain a complete short message upon receiving the message.

2 Claims, 8 Drawing Sheets

U.S. PATENT DOCUMENTS

| | | | | |
|---|---|---|---|---|
| 2007/0156909 | A1* | 7/2007 | Osborn et al. | 709/227 |
| 2007/0249379 | A1* | 10/2007 | Bantukul | 455/466 |
| 2007/0281717 | A1* | 12/2007 | Bharadwaj | 455/466 |
| 2007/0298817 | A1* | 12/2007 | Alfano et al. | 455/466 |

FOREIGN PATENT DOCUMENTS

| | | |
|---|---|---|
| CN | 1656768 | 8/2005 |
| CN | 1703102 | 11/2005 |
| JP | 2004152281 | 5/2004 |

OTHER PUBLICATIONS

First Office Action issued in corresponding Chinese Patent Application No. 200610109853.4, mailed Oct. 16, 2009.

European Communication and Search Report issued in corresponding European Patent Application No. 07800985.9, mailed Jan. 19, 2010.

Borenstein et al., "MIME (Multipurpose Internet Mail Extensions) Part One: Mechanisms for Specifying and Describing the Format of Internet Message Bodies". Network Working Group—Standards Track, Innosoft Sep. 1993.

Campbell, Ed., "Session Initiation Protocol (SIP) Extension for Instant Messaging", Network Working Group—Standards Track, Microsoft Corp, Dec. 2002.

Campbell, Ed., "The Message Session Relay Protocol draft-ietf-simple-message-sessions-14", Network Working Group Internet Draft, Feb. 25, 2006.

3GPP TS 23.040 version 6.7.0 Release 6. ETSI TS 123 040 V6.7.0, Jul. 2006. XP 14034197A.

3GPP TSG CN Plenary Meeting #19, Mar. 12-14, 2003, Birmingham, U.K. TSG CN WG2#28 Draft Meeting Report v1.1.0, MCC Agenda Item 6.2.1., Feb. 10-15, 2003. Dublin, Ireland.

3GPP TSG SA WG2 Architecture—S2#47, Change Request 23.804 CR 0003, current version 7.0.0. S2-051726. Jun. 27-Jul. 1, 2005, Montreal, Canada.

"Digital Cellular telecommunications system (Phase 2+); Universal Mobile Telecommunications System (UMTS); Technical Realization of Short Message Service (SMS) (3GPP TS 23.040 version 6.7.0 Release 6)", ETSI TS 123 040 V.6.7.0, Mar. 2006.

"$3^{rd}$ Generation Partnership Project; Technical Specification Group Core Network and Terminals; Technical Realization of the Short Message Service (SMS) (Release 6)", 3GPP TS 23.040 V6.7.0., Mar. 2006.

"$3^{rd}$ Generation Partnership Project; Technical Specification Group Services and System Aspects; Support of SMS and MMS over generic 3GPP IP access; Stage 2 (Release 7)", 3GPP TS 23.204 V1.2.0, May 2006.

"$3^{rd}$ Generation Partnership Project; Technical Specification Group Core Network and Terminals; Support of SMS and MMS over IP networks; Stage 3 (Release 7)", 3GPP TS 24.341 V0.2.0, Jul. 2006.

"Support of SMS and MMS over generic 3GPP IP access," Stage 2 (Release 7); 3rd Generation Partnership Project; Technical Specification Group Services and System Aspects; Sophia Antipolis, FR; May 2006, pp. 1-15.

* cited by examiner

METHOD, SYSTEM AND APPARATUS FOR TRANSFERRING SHORT MESSAGES IN AN IMS

CROSS-REFERENCE TO RELATED APPLICATIONS

This application is a continuation of International Application No. PCT/CN2007/070509, filed Aug. 17, 2007, which claims priority to Chinese Patent Application No. CN200610109853.4, filed Aug. 18, 2006, both of which are hereby incorporated by reference in their entireties.

FIELD OF THE INVENTION

The present invention relates to IP multimedia subsystem (IMS) technologies, and in particular, to a method, system and apparatus for transferring short messages in an IMS.

BACKGROUND OF THE INVENTION

The Session Initiation Protocol (SIP) is one of the framework agreements for multimedia communication systems formulated by the Internet Engineering Task Force (IETF). The SIP is a text-based application-layer control protocol, which is independent of the lower-layer protocols and is designed to create, modify and terminate two-party or multi-party multimedia sessions on an IP network. The SIP technology provides a forking mechanism so that a SIP message can be received by multiple user equipments (UEs) correlated with a user ID. Forking comes in two types: parallel forking and serial forking. Parallel forking means that a proxy sends a SIP message to multiple UEs concurrently. Serial forking means the proxy sends a SIP message to each of multiple UEs one by one; if a UE returns a success response, the proxy stops sending SIP messages to other UEs; otherwise, the proxy continues sending SIP messages to other UEs until the SIP message is sent to all UEs.

The IMS is a subsystem proposed in the $3^{rd}$ Generation Project Partnership (3GPP) Release 5 standard to support IP multimedia services. The IMS is based on SIP, and uses a SIP call control mechanism to create, manage and terminate various multimedia services. The IMS adopts the SIP-based forking mechanism, which is implemented by the Serving Call Session Control Function (S-CSCF) of the IMS. The S-CSCF receives registration information of the UE, and correlates the public user ID with the UE address. When a public user ID is correlated with multiple UE addresses, the SIP message sent to the public user ID is forked at the S-CSCF. The user configures whether the S-CSCF performs parallel forking or serial forking for the received messages. Namely, the user who correlates multiple UEs with the same public user ID can configure user data to decide whether the received SIP message undergoes parallel forking or serial forking.

The short message service (SMS) is maturely developed and widely applied in the traditional circuit switched (CS) domain. In order to continue developing the SMS and enable the SMS in the future IP network, the 3GPP organization sets up a topic to study how to use the SMS over IP. Currently, the 3GPP solves the SMS over IP by introducing an IP short message gateway (IP-SM-GW) as an SMS gateway between the IMS domain and the CS domain. When an IMS domain user sends a short message to a CS domain user, the short message is encapsulated in a SIP message body, and sent to the IP-SM-GW. The IP-SM-GW extracts the short message from the SIP message body, and sends the short message to the CS domain. The short message is sent by the CS domain user to the IMS domain user, and then transferred to the IP-SM-GW. The IP-SM-GW constructs a SIP message, encapsulates the short message into the SIP message body, and sends the SIP message body to the IMS domain user. The 3GPP TS 23.040 is a standard about SMS, and stipulates that a short message can carry a maximum data input of 140 bytes; if the data input is more than 140 bytes, the UE can send the short message through multiple correlated short messages, and the message receiver can assemble the multiple correlated short messages into a complete message.

When a CS domain user sends multiple message segments to an IMS domain user, because the IMS domain user owns multiple UEs, the short message undergoes forking at the S-CSCF. When the UE receives the message, the wireless network may be instable, so that some message segments fail to be received and the short message received by the UE is incomplete. Moreover, when a short message interworks with a SIP message, upon receiving multiple message segments, the IP-SM-GW converts them into multiple SIP messages directly, and sends them to the IMS terminal, without embodying the relationships between them. However, the IMS terminal is unable to assemble the SIP messages into a complete message. Namely, the IMS terminal is unable to obtain a complete short message. Further, the message segmentation in the IMS domain brings multiple SIP messages, which increases the load on the network.

SUMMARY OF THE INVENTION

Accordingly, an embodiment of the present invention provides a method for delivering short messages in an IMS to overcome incompleteness of the message received by a receiver in the IMS domain. An embodiment of the present invention also provides an apparatus for delivering short messages in an IMS. Further, an embodiment of the present invention provides a system for delivering short messages in an IMS.

In order to fulfill the preceding objectives, an embodiment of the present invention provides a method for transferring short messages in an IMS. The method comprises:

receiving, by a sender, concatenated short message (SMS) segments;

encapsulating, the multiple short messages segments into an IMS message; and sending the IMS message to the receiver.

An embodiment of the present invention provides a method for transferring short messages in an IMS. The method comprises:

receiving, by a sender, concatenated short message (SMS) segments;

building, MSRP Session between the sender and a receiver;

encapsulating, the multiple short messages segments into one or more SEND messages; and sending the SEND messages to the receiver through the created MSRP session.

An embodiment of the present invention provides a method for transferring short messages in an IMS. The method comprises:

receiving, by a sender, an IMS message;

encapsulating, multiple concatenated short message segments according to the IMS message; and sending multiple concatenated short message segments to the receiver.

Further, an embodiment of the present invention also provides an apparatus for delivering short messages in an IMS. The apparatus serves as a sender and comprises:

an encapsulating unit, adapted to encapsulate concatenated short messages into an IMS message, and send the IMS message to a sending unit; and a sending unit, adapted to send the IMS message to the receiver.

Further, an embodiment of the present invention provides an apparatus for delivering short messages in an IMS. The apparatus serves as a receiver and comprises:

a receiving unit, adapted to receive the IMS message encapsulated and sent by a sender, and send the IMS message to an extracting unit; and the extracting unit, adapted to extract short messages from the IMS message.

An embodiment of the present invention also provides a system for delivering short messages in an IMS. The system comprises a sender and a receiver. The sender comprises an encapsulating unit and a sending unit; and the receiver comprises a receiving unit and an extracting unit, wherein:

the encapsulating unit is adapted to encapsulate concatenated short messages into an IMS message, and send the IMS message to the sending unit;

the sending unit is adapted to send the IMS message to the receiving unit of the receiver;

the receiving unit is adapted to receive the IMS message sent by the sender, and send the IMS message to the extracting unit; and the extracting unit is adapted to extract short messages from the IMS message.

As seen from the preceding technical solution, the embodiments of the present invention encapsulates concatenated short messages into an IMS message, for example, puts them into one or more message bodies of an IMS message, or converts them into an IMS message; upon receiving the IMS message, the receiver can obtain the whole message, thus overcoming the problem in the prior art that a short message cannot be obtained completely. Besides, multiple segments of concatenated short messages are directly put into or converted into an IMS message or multiple IMS messages of one session. Therefore, the receiver can easily assemble the complete segments of the short messages in an IMS message, thus overcoming the inability of the receiver to assemble multiple message segments in the case of interworking between a short message and a SIP message. Further, the embodiments of the present invention reduce the number of SIP messages that are brought by the message segmentation in the IMS domain, thus decreasing the load on the network.

DETAILED DESCRIPTION OF THE EMBODIMENTS

For better understanding of the objectives, the technical solution and merits of the present invention, the present invention is hereinafter described in detail with reference to the follow embodiments.

The essence of the present invention is: The sender in the IMS domain encapsulates concatenated short message segments into multiple message bodies of an IMS message, or encapsulates multiple concatenated short message segments into one message body of an IMS message, or encapsulates multiple concatenated short message segments into the message body of one or more IMS messages of one session, and then sends the message body/bodies to the receiver. The encapsulation here may be: putting concatenated short message segments into one or more message bodies of an IMS message directly, or converting the concatenated short message segments into an IMS message or to multiple IMS messages of a session. In the following embodiments, the encapsulation comprises the foregoing two modes. The preceding IMS message may be a SIP message, or an IMS message in other protocols, for example, the SEND message in the Message Session Relay Protocol (MSRP).

Figure 1:
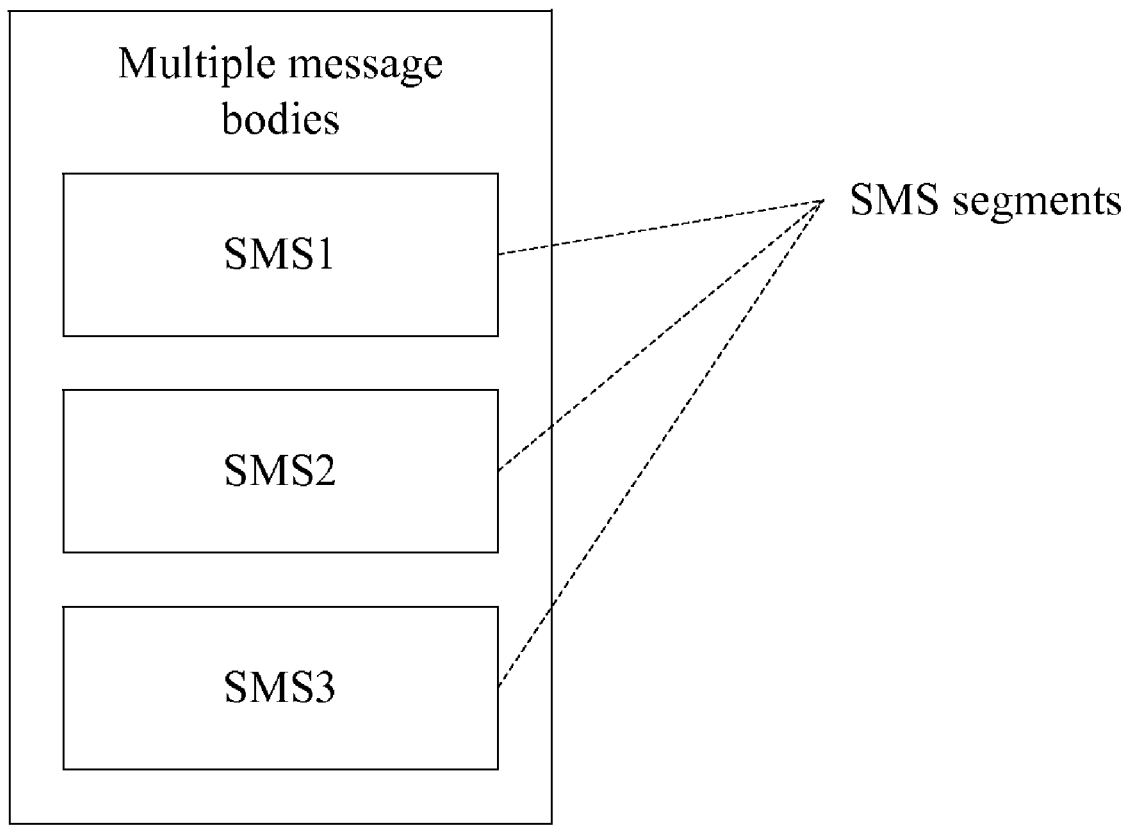
FIG. 1 shows the structure consisting of multiple message bodies according to an embodiment of the present invention.

FIG. 1 shows the structure consisting of multiple message bodies according to an embodiment of the present invention. As shown in FIG. 1, for the mode of putting concatenated short message segments into an IMS message directly, a whole short message is divided into three concatenated short message segments: SMS1, SMS2 and SMS3, which are encapsulated into three message bodies of an IMS message separately. Therefore, the three concatenated short message segments are located in an IMS message. For the mode of converting a short message, the SMS1, SMS2 and SMS3 are collected and converted into SIP message format or SEND message of the MRSP format.

In the first embodiment, short messages are sent from the CS domain to the IMS domain, and concatenated short message segments are encapsulated into multiple message bodies of a SIP message.

Figure 2:
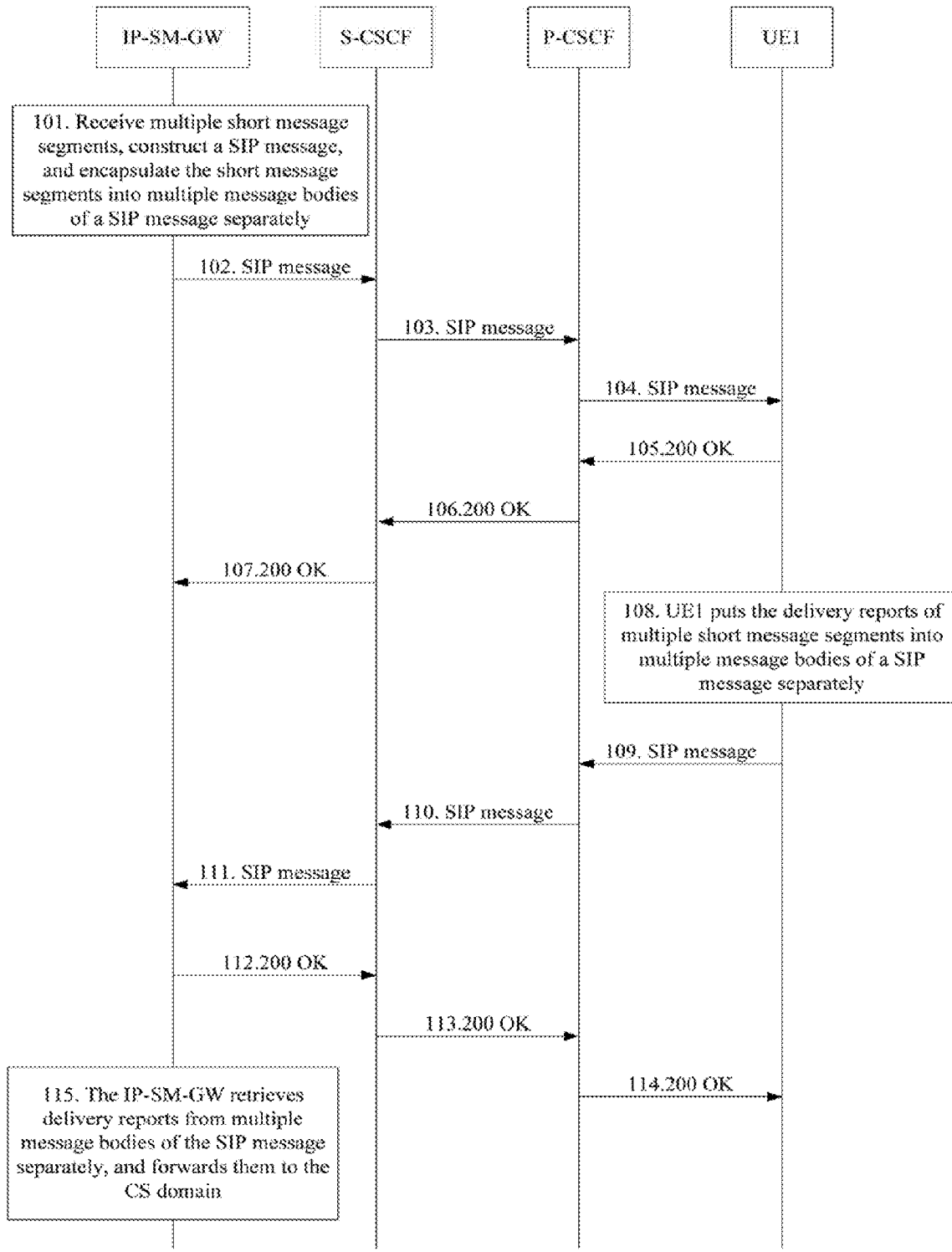
FIG. 2 is a flowchart showing the process according to a first embodiment of the present invention.

As shown in FIG. 2, the process of the first embodiment of the present invention includes the following steps:

Step 101: The IP-SM-GW checks the short message sent from the CS domain. According to the relevant parameters in the received short message, the IP-SM-GW judges whether the short message is one segment of concatenated short message segments. If the short message is one segment of concatenated short message segments, the IP-SM-GW receives the remaining concatenated short message segments according to a preset waiting time. After all of the concatenated short message segments are received or the preset waiting time ends, all of the received concatenated short message segments are encapsulated into multiple message bodies of a SIP message.

The following shows the format of a SIP message containing multiple message bodies:

Content-Type:multipart/related;type="application/vnd.3gpp.sms";
start="<nXYxAE@pres.vancouver.example.com>";
boundary="50UBfW7LSCVLtggUPe5z"
Content-Length:...
--50UBfW7LSCVLtggUPe5z
Content-ID:<nXYxAE@pres.vancouver.example.com>
Content-Type:application/vnd.3gpp.sms
/*SMS segment*/
--50UBfW7LSCVLtggUPe5z -continued

```
Content-ID:<bUZBsM@pres.vancouver.example.com>
Content-Type:application/vnd.3gpp.sms
/*SMS segment*/
--50UBfW7LSCVLtggUPe5z--
```

In the preceding SIP message, a Multimedia Internet Mail Extension (MIME) format is adopted. In the format, Content-Type:multipart/related;type=application/vnd.3gpp.sms defines the message type (that is, multiple message bodies) and the applied standard; start=<nXYxAE@pres.vancouver.example.com> indicates the start of the message; boundary=50UBfW7LSCVLtggUPe5z indicates the boundary of the message; Content-Length: . . . indicates the length of the message; /*SMS segment*/indicates the content of the message body (that is, concatenated short message segment in this embodiment); and—50UBfW7LSCVLtggUPe5z—indicates the end of the message.

Step 102 to step 104: The IP-SM-GW sends the SIP message containing multiple message bodies, and the SIP message is routed through the S-CSCF and the P-CSCF to UE1.

When the SIP message passes through an S-CSCF, the S-CSCF can execute a forking mechanism for the SIP message, and send it to multiple UEs. The processes of sending the SIP message to UEs are similar, so this embodiment describes only the process of sending the SIP message to UE1.

Step 105 to step 107: Upon receiving the SIP message, UE1 sends a 200 OK response message to the IP-SM-GW to confirm the receipt of the SIP message. This 200 OK response message is routed through the P-CSCF and the S-CSCF to the IP-SM-GW.

If the response message sent by UE1 in step 105 indicates that the SIP message is oversized (i.e., the response message is message 413), then in step 107, the IP-SM-GW processes the short message segments received in step 101 according to a same process as that in the prior art. That is, the IP-SM-GW constructs the same quantity of SIP messages, and each SIP message bears a short message segment and is sent to UE1, thus ensuring that the short message is transferred successfully.

Step 108: UE1 constructs a SIP message containing multiple message bodies, and encapsulates each delivery report related to a short message segment into a message body.

Step 109 to step 111: UE1 sends the constructed SIP message to the SIP-SM-GW. The SIP message carries the message bodies constructed in step 108. The SIP message is routed to the IP-SM-GW through the S-CSCF and the P-CSCF.

Step 112 to step 114: Upon receiving the SIP message, the IP-SM-GW sends a 200 OK response message to UE1. The response message is routed to UE1 through the P-CSCF and the S-CSCF.

Step 115: The IP-SM-GW resolves multiple delivery reports carried in the multiple message bodies of the SIP message received in step 111, and sends each delivery reports to the CS domain separately.

In the second embodiment, a short message is sent from the IMS domain to the CS domain, and multiple short message segments are encapsulated into multiple message bodies of a SIP message.

Figure 3:
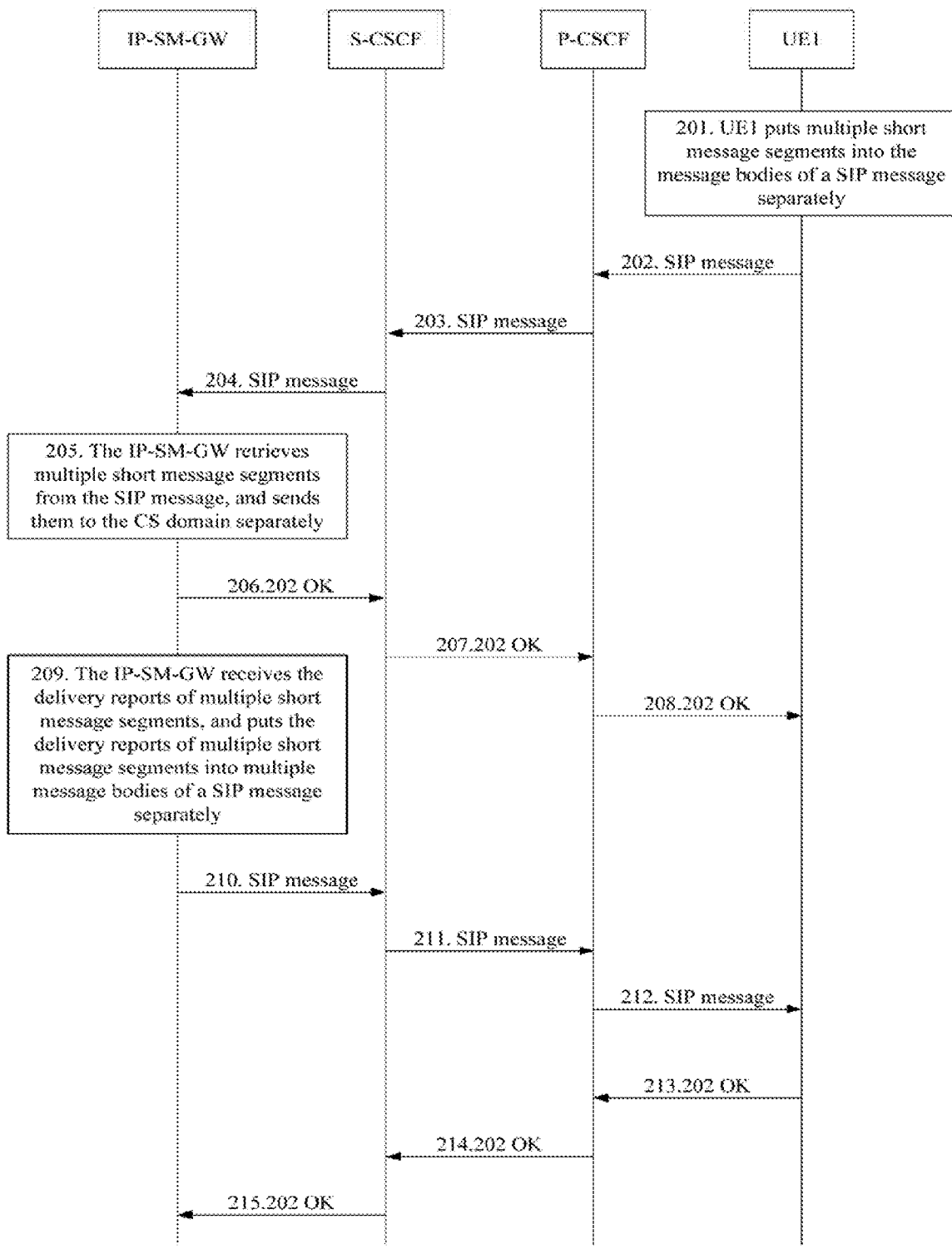
FIG. 3 is a flowchart showing the process according to a second embodiment of the present invention.

As shown in FIG. 3, the process of the second embodiment of the present invention includes the following steps:

Step 201: UE1 constructs a SIP message containing multiple message bodies. Short message segments which are concatenated to one message are encapsulated in multiple message bodies of the SIP message separately.

Step 202 to step 204: UE1 sends a SIP message, and the SIP message is routed to the IP-SM-GW through the P-CSCF and the S-CSCF.

Step 205: The IP-SM-GW extracts the concatenated short message segments from multiple message bodies of the SIP message, and sends them to the CS domain separately.

Step 206 to step 208: The IP-SM-GW sends a 202 OK response message to confirm the SIP message received in step 204; and the 202 OK response message is routed to UE1 through the S-CSCF and the P-CSCF.

Step 209: The IP-SM-GW receives delivery reports of the concatenated short message segments from the CS domain, constructs a SIP message, and puts the delivery reports of the concatenated short message segments into multiple message bodies of a SIP message separately.

Step 210 to step 212: The IP-SM-GW sends the SIP message constructed in step 209. The SIP message is routed to UE1 through the S-CSCF and the P-CSCF.

Step 213 to step 215: Upon receiving the SIP message, UE1 sends a 200 OK response message for confirmation. The response message is routed to the IP-SM-GW through the P-CSCF and the S-CSCF.

In the third embodiment, the short messages are sent from the CS domain to the IMS domain, and the multiple concatenated short message segments are converted to one SIP message.

Figure 4:
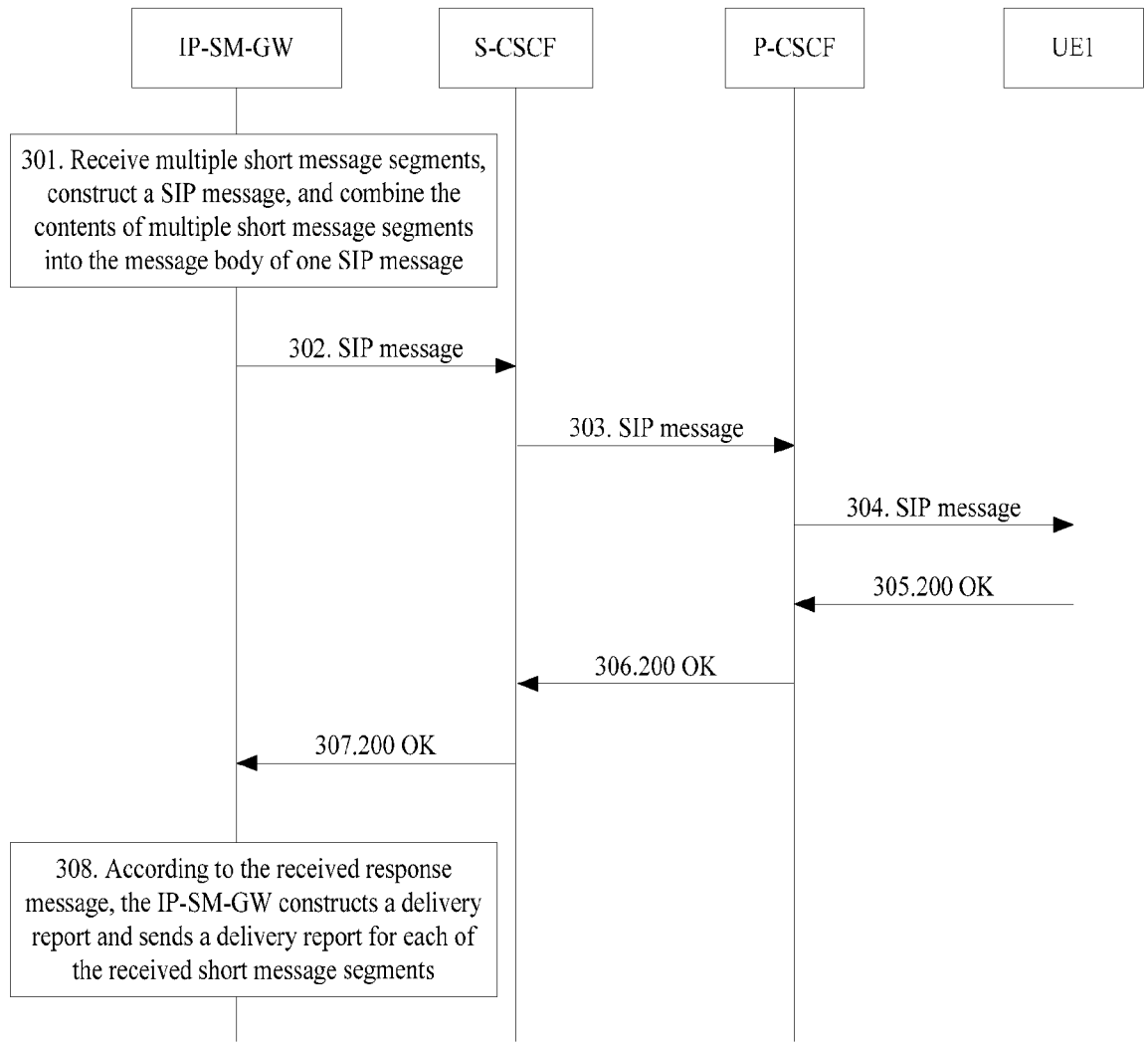
FIG. 4 is a flowchart showing the process according to a third embodiment of the present invention.

As shown in FIG. 4, the process of the third embodiment of the present invention includes the following steps:

Step 301: The IP-SM-GW checks the short message sent from the CS domain. According to the relevant parameter in the received short message, the IP-SM-GW checks whether the short message is one segment of concatenated short message segments. If the short message is one segment of concatenated short message segments, the IP-SM-GW waits for receiving the remaining segment of the concatenated short message segments according to a preset waiting time. After all segments are received or the wait time ends, the contents of the short message segments are extracted from the concatenated short message segments according to the sequence of segmentation to assemble into a complete message. A SIP message is constructed, and the complete message is put into one message body of the SIP message; and the control information in the short message is put into the header field of the SIP message as header field information. Afterward, the SIP message is sent to the receiver.

Step 302 to step 304: The IP-SM-GW sends the SIP message, and the SIP message is routed to UE1 through the S-CSCF and the P-CSCF.

Step 305 to step 307: Upon receiving the SIP message, UE1 sends a 200 OK response message for confirmation. The response message is routed to the IP-SM-GW through the P-CSCF and the S-CSCF.

Step 308: According to the received response message, the IP-SM-GW constructs delivery reports, and sends a delivery report for each of the received multiple message segments separately.

If the response message sent by UE1 in step 305 indicates that the SIP message is oversized (i.e., the response message is message 413), then in step 307, the IP-SM-GW processes the short message segments received in step 101 according to a same process as that in the prior art. That is, the IP-SM-GW constructs the SIP messages of the same quantity, in which each SIP message bears a separate message segment and is sent to UE1, thus ensuring that the short message is transferred successfully.

In the fourth embodiment, the IMS domain sends a SIP message to the CS domain, the content of which is more than 140 bytes. After finding that the size of SIP message is longer than 140 bytes, the IP-SM-GW converts the SIP message into concatenated short messages segments and sends them to the CS domain.

Figure 5:
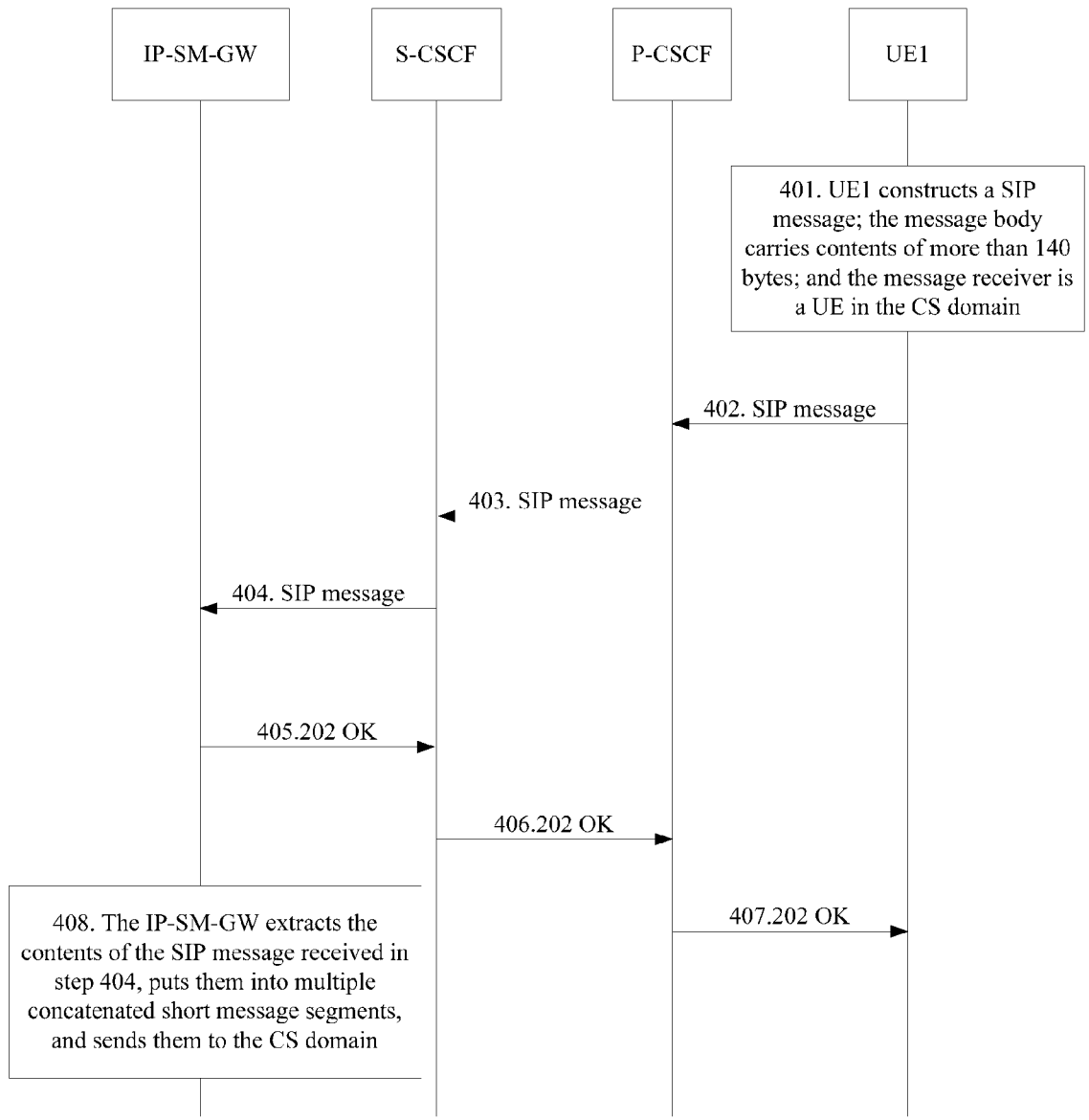
FIG. 5 is a flowchart showing the process according to a fourth embodiment of the present invention.

As shown in FIG. 5, the process of the fourth embodiment of the present invention includes the following steps:

Step 401: UE1 constructs a SIP message, and the content of the message body of the SIP message is more than 140 bytes that a short message contains, which exceeds the maximum amount of data that can be carried by a short message. UE1 then sends out the SIP message.

Step 402 to step 404: UE1 sends the SIP message to the IP-SM-GW, and the SIP message is routed through the P-CSCF and the S-CSCF.

Step 405 to step 407: Upon receiving the SIP message, the IP-SM-GW sends a 202 OK response message for confirmation. The response message is routed to UE1 through the S-CSCF and the P-CSCF.

Step 408: The IP-SM-GW checks the SIP message received in step 404, and finds that the content of the message body of the SIP message exceeds the maximum of bytes of a single short message could bear. Therefore, the IP-SM-GW generates concatenated short message segments, puts the content of the SIP message into multiple concatenated short message segments, and then sends them to the CS domain.

In the IMS domain, besides the SIP message, the MSRP can also be used to transfer messages. Therefore, another solution is to use the messages in the MSRP instead of the SIP message to bear short messages.

In the fifth embodiment, the short messages are sent from the CS domain to the IMS domain, and the message in the MSRP is used to bear short messages.

Figure 6:
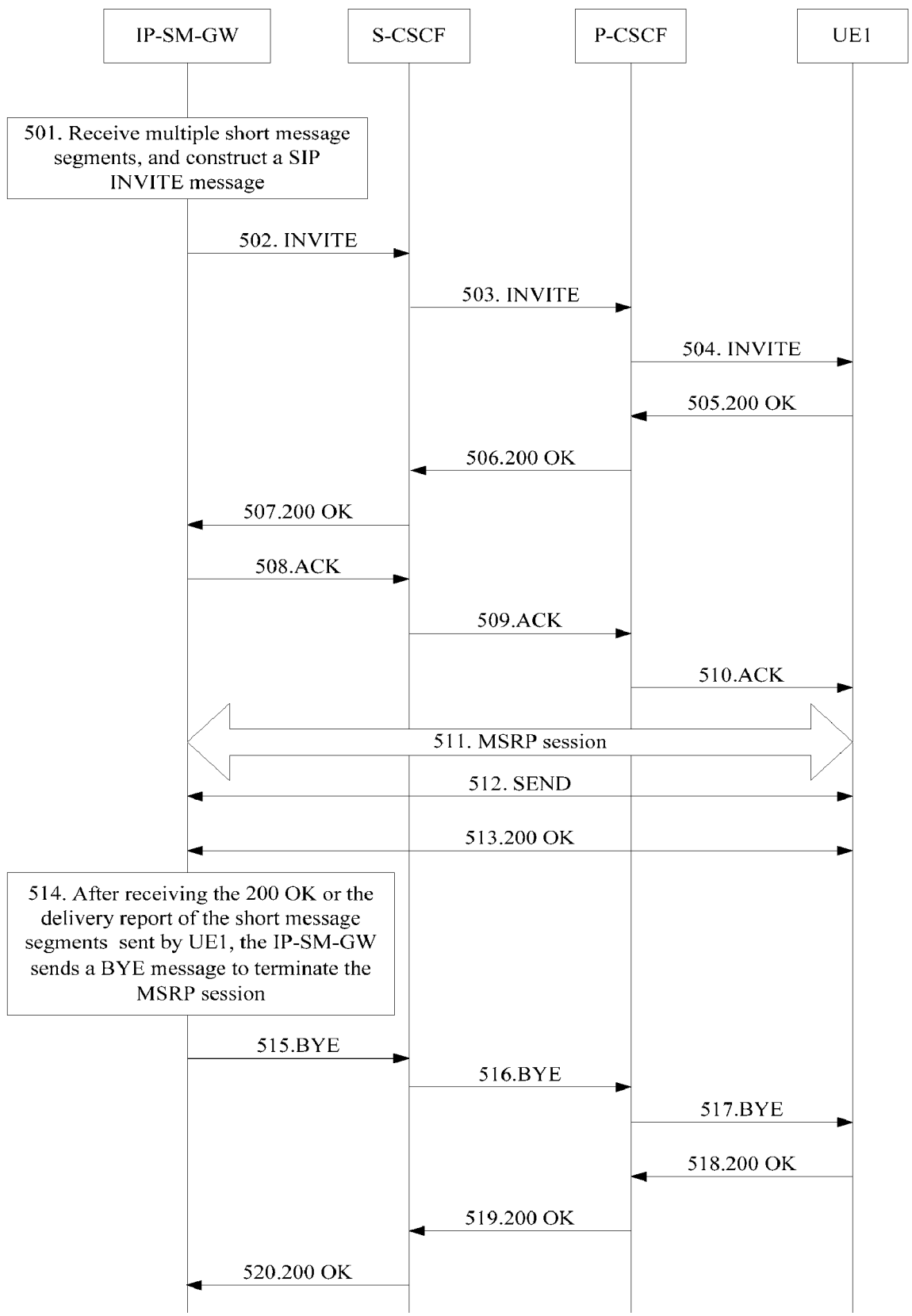
FIG. 6 is a flowchart showing the process according to a fifth embodiment of the present invention.

As shown in FIG. 6, the process of the fifth embodiment of the present invention includes the following steps:

Step 501: Similar to step 101 and step 301. The IP-SM-GW checks the short message sent from the CS domain, and uses the multiple message bodies format to encapsulate multiple concatenated short message segments of one short message into one or more message bodies; or converts the format, extracts the contents of multiple concatenated short message segments of one short message, and assembles them into one complete content according to segmentation sequence and puts the complete content into a single message body.

Step 502 to step 504: The IP-SM-GW sends an INVITE message to UE1. The INVITE message is routed to UE1 through the S-CSCF and the P-CSCF.

Step 505 to step 507: Upon receiving the INVITE message, UE1 sends a 200 OK response message to the IP-SM-GW. The response message is routed to the IP-SM-GW through the P-CSCF and the S-CSCF.

Step 508 to step 510: Upon receiving the response message, the IP-SM-GW sends an acknowledgement (ACK) message to UE1. The ACK message is routed to UE1 through the S-CSCF and the P-CSCF.

The process from step 502 to step 510 is as follows: The IP-SM-GW sends an INVITE message with Session Description Protocol (SDP) to UE1, so as to establish an MSRP session between the IP-SM-GW and UE1.

Step 511: An MSRP session is established between the IP-SM-GW and UE1.

Step 512: The IP-SM-GW constructs SEND message(s). Through one or more SEND messages, the IP-SM-GW sends the message bodies constructed in step 501 to UE1 through the established MSRP session.

If the message body in step 501 encapsulates multiple concatenated short message segments through multiple message bodies, UE1 encapsulates separately the delivery report of every concatenated short message segment into the message body of the SEND message in the format of multiple message bodies, and sends them to the IP-SM-GW.

Step 513: UE1 or the IP-SM-GW sends a 200 OK message to confirm the receipt of the SEND message.

Step 514: If the message body constructed in step 501 encapsulates the short message completely, the IP-SM-GW sends a BYE message to UE1 actively to terminate the MSRP session upon receiving all delivery reports of multiple concatenated short message segments that are sent by UE1 in the MSRP session. If the message body constructed in step 501 encapsulates the contents of the short message, the IP-SM-GW sends a BYE message to UE1 actively to terminate the MSRP session upon receiving the 200 OK message.

Step 515 to step 517: The IP-SM-GW sends a BYE message to UE1 to terminate the created MSRP session. The BYE message is routed to UE1 through the S-CSCF and the P-CSCF.

Step 516 to step 520: Upon receiving the BYE message, UE1 sends a 200 OK response message to the IP-SM-GW. The response message is routed to the IP-SM-GW through the P-CSCF and the S-CSCF, thus terminating the established MSRP session.

In the sixth embodiment, a short message is sent from the IMS domain to the CS domain, and the message in the MSRP is used to carry the short message.

Figure 7:
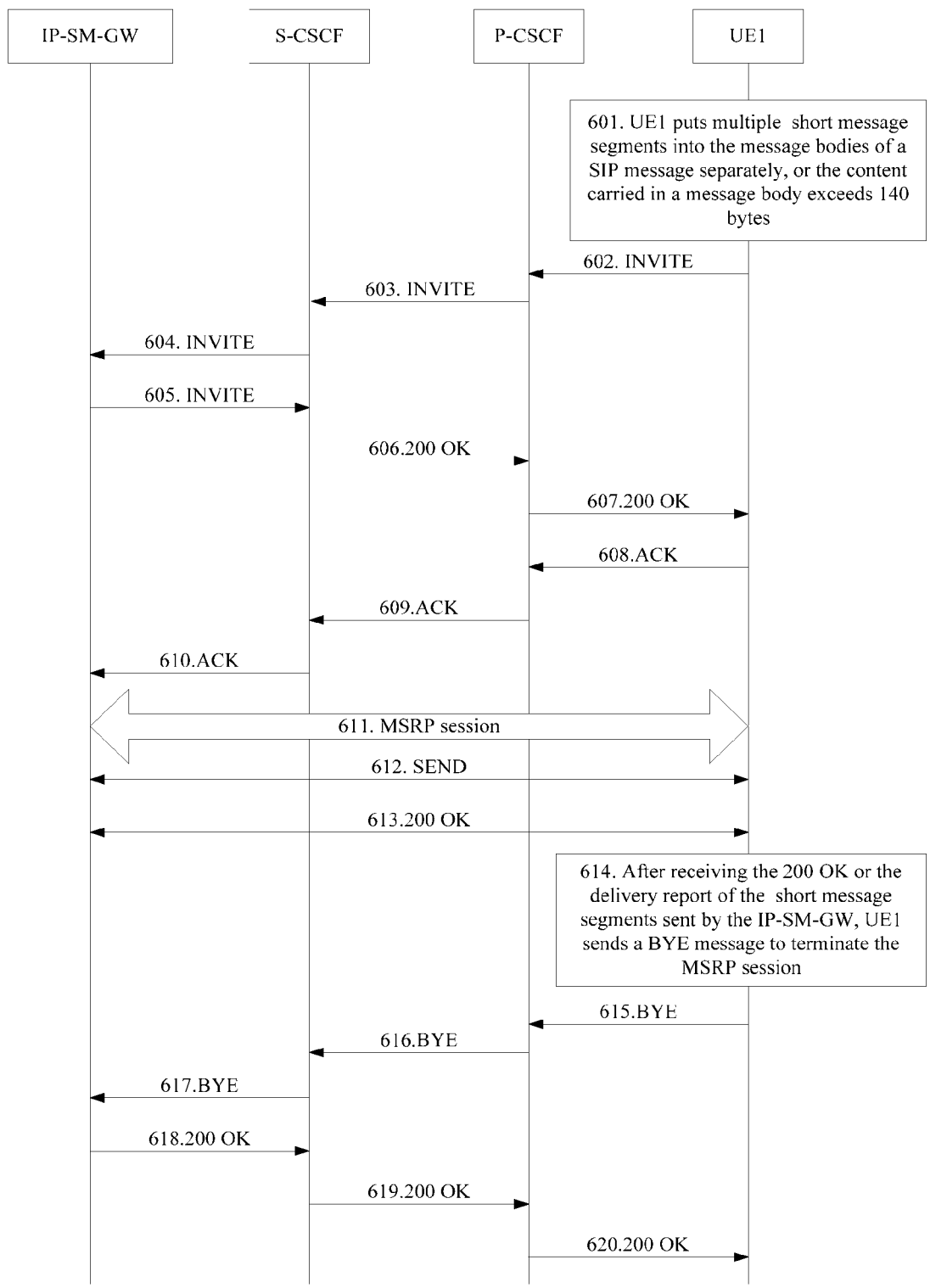
FIG. 7 is a flowchart showing the process according to a sixth embodiment of the present invention.

As shown in FIG. 7, the process of the sixth embodiment of the present invention includes the following steps:

Step 601: Similar to step 201 and step 401. UE1 encapsulates the contents of multiple concatenated short message segments correlated to one short message into one or more message bodies, or encapsulates the contents of message which is more than 140 bytes into one or more message bodies.

Step 602 to step 604: UE1 sends an INVITE message to the IP-SM-GW. The INVITE message is routed to the IP-SM-GW through the P-CSCF and the S-CSCF.

Step 605 to step 607: Upon receiving the INVITE message, the IP-SM-GW sends a 200 OK response message to UE1. The response message is routed to UE1 through the S-CSCF and the P-CSCF.

Step 608 to step 610: Upon receiving the response message, UE1 sends an ACK message to the IP-SM-GW. The ACK message is routed to the IP-SM-GW through the P-CSCF and the S-CSCF.

The process from step 602 to step 610 is as follows: UE1 sends an INVITE message to IP-SM-GW to perform SDP interaction, so as to establish an MSRP session between UE1 and the IP-SM-GW.

Step 611: An MSRP session is established between UE1 and the IP-SM-GW.

Step 612: UE1 constructs SEND message(s). Through one or more SEND messages, UE1 sends the message bodies constructed in step 601 to the IP-SM-GW through the created MSRP session.

If the message body in step 601 encapsulates multiple concatenated short message segments through multiple message bodies, the IP-SM-GW encapsulates the delivery report of every concatenated short message segment into the message body of the SEND message separately in the format of multiple message bodies, and sends them to UE1.

Step 613: The IP-SM-GW or UE1 sends a 200 OK message to confirm the SEND message received.

Step 614: If the message body constructed in step 601 encapsulates the whole short message completely, UE1 sends a BYE message to the IP-SM-GW actively to terminate the MSRP session upon receiving all delivery reports of multiple concatenated short message segments that are sent by the IP-SM-GW in the MSRP session. If the message body constructed in step 601 is in a simple message content format, UE1 sends a BYE message to the IP-SM-GW actively to terminate the MSRP session upon receiving the 200 OK message.

Step 615 to step 617: UE1 sends a BYE message to the IP-SM-GW to terminate the established MSRP session. The BYE message is routed to the IP-SM-GW through the S-CSCF and the P-CSCF.

Step 616 to step 620: Upon receiving the BYE message, the IP-SM-GW sends a 200 OK response message to UE1. The response message is routed to UE1 through the P-CSCF and the S-CSCF, thus terminating the established MSRP session.

In the preceding embodiments of the present invention, the IMS entity for receiving and sending SIP messages may be an IP-SM-GW or other entities such as an application server (AS).

Moreover, in the technical solution of the present invention, it is possible that the receiver does not support combination of the concatenated short message segments. To apply the prior art in scenarios where the receiver does not support combination of message segments, the SIP may be adopted as follows:

Defining an option tag, for example, option tag="mergesms",

In the "Requires" header field of the SIP message that encapsulates multiple short messages, the sender puts "mergesms" to indicate that the receiver must be capable of combining short message segments. If the receiver does not have this capability, the receiver returns a 421 response, which carries the option tag that indicates inability to combine short message segments. According to the returned 421 response and the relevant information, the sender verifies that the receiver does not support the combination of short message segments. Therefore, the sender resends the uncombined concatenated short message segments as in the prior art. It should be noted that the negotiation of extended capabilities is required only in scenarios where the short message segments are encapsulated.

Figure 8:
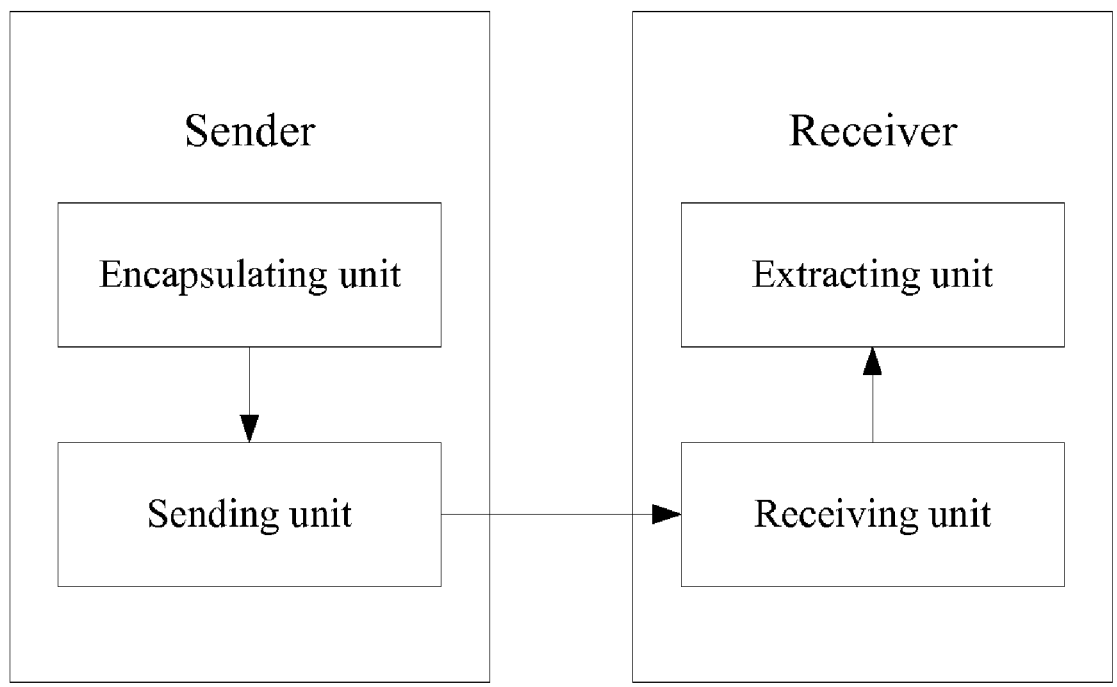
FIG. 8 is a flowchart showing the system structure according to an embodiment of the present invention.

FIG. 8 shows the system architecture according to an embodiment of the present invention. The system comprises a sender and a receiver. The sender comprises an encapsulating unit and a sending unit; and the receiver comprises a receiving unit and an extracting unit.

In this system, the encapsulating unit of the sender is adapted to encapsulate multiple concatenated short message segments into an IMS message, and send the IMS message to the sending unit; the sending unit is adapted to send the IMS message to the receiver. The encapsulation performed by the sender may be: putting the short messages into one or more message bodies of an IMS message directly, or converting the short messages into an IMS message.

The receiving unit of the receiver is adapted to receive the encapsulated IMS message sent by the sender, and send the IMS message to the extracting unit; and the extracting unit is adapted to extract the short message from the IMS message.

Further, when the sender is an IMS entity and the receiver is a UE, the encapsulating unit may comprise a first encapsulating unit and a second encapsulating unit. The first encapsulating unit is adapted to put multiple concatenated short message segments into multiple message bodies of an IMS message separately, or into multiple session-based IMS messages. The second encapsulating unit is adapted to convert multiple concatenated short message segments into message (s) in a specified IMS message format. The conversion between the short messages and the IMS message(s) is: converting the control information of the short message into the header field information corresponding to the IMS message (s); converting the content of the short messages into the content in the specified code format of the IMS message(s). However, the present invention is not limited to such conversion modes.

When the sender is a UE and the receiver is an IMS entity, the encapsulating unit comprises a third encapsulating unit. The third encapsulating unit is adapted to put multiple concatenated short message segments into multiple message bodies of an IMS message separately, or into multiple session-based IMS messages.

The IMS entity in the preceding system may be an AS or an IP-SM-GW.

Further, the IMS message generated by each encapsulating unit may be a SIP message.

Further, the IMS message generated by each encapsulating unit may be a SEND message in the MSRP. In this case, the sender may further comprise a sender MSRP unit, and the receiver further comprises a receiver MSRP unit. The sender MSRP unit and the receiver MSRP unit are adapted to establish an MSRP session between the sender and the receiver; the sending unit sends a SEND message through an MSRP session; and the receiving unit receives the SEND message through an MSRP session.

The preceding technical solution shows that, because the embodiments of the present invention encapsulate multiple concatenated short message segments into an IMS message, upon receiving the IMS message, the receiver can obtain a complete short message, thus overcoming the incompleteness of a short message obtained in the prior art. Moreover, multiple concatenated short message segments are directly put into or converted into an IMS message or multiple IMS messages of one session. Therefore, the receiver can easily assemble the short message segments in an IMS message, thus overcoming the inability of the receiver to assemble multiple short message segments in the case of interworking between a short message and a SIP message. Furthermore, the embodiments of the present invention reduce the number of SIP messages brought by short message segmentation in the IMS domain, thus decreasing the load on the network.

The preceding embodiments are exemplary embodiments of the present invention only and not intended to limit the present invention. Any modification, equivalent substitution or improvement without departing from the spirit and principle of the invention should be covered in the scope of protection of the invention.

What is claimed is:

1. A method for transferring short messages in an IP Multimedia Subsystem (IMS), comprising:
   receiving, by an IP short message gateway (IP-SM-GW), concatenated short message (SM) segments;
   presetting, by the IP-SM-GW, a waiting time for receiving the concatenated SM segments;
   formatting, by the IP-SM-GW, contents of the received concatenated SM segments in a type utilized by a Session Initiation Protocol (SIP) request message if the waiting time ends or if all of the concatenated SM segments have been received in the waiting time;
   setting, by the IP-SM-GW, the formatted contents of the received concatenated SM segments to contents of a body of the SIP request message if the waiting time ends or if all of the concatenated SM segments have been received in the waiting time; and sending, by the IP-SM-GW, the SIP request message to a user equipment (UE) through a Serving Call Session Control Function (S-CSCF) in the IP Multimedia Subsystem.

2. A method for transferring short messages in an IP Multimedia Subsystem (IMS), comprising:

receiving, by an IP short message gateway (IP-SM-GW), concatenated short message (SM) segments;

building, a Message Session Relay Protocol (MSRP) Session between the IP-SM-GW and a User Equipment (UE);

presetting, by the IP-SM-GW, a waiting time for receiving the concatenated short message segments;

formatting, by the IP-SM-GW, contents of the received concatenated SM segments in a type utilized by a MSRP SEND message if the waiting time ends or if all of the concatenated SM segments have been received in the waiting time;

setting, by the IP-SM-GW, the formatted contents of the received concatenated SM segments to contents of a body of the MSRP SEND message if the waiting time ends or if all of the concatenated SM segments have been received in the waiting time; and sending, by the IP-SM-GW, the MSRP SEND message to the UE through the MSRP Session.

* * * * *